US012593828B2

(12) United States Patent
Celerier et al.

(10) Patent No.: US 12,593,828 B2
(45) Date of Patent: Apr. 7, 2026

(54) ANIMAL ACTIVITY RACK SYSTEM

(71) Applicant: HARVARD BIOSCIENCE INC.,
Holliston, MA (US)

(72) Inventors: Evelyne Celerier, Piera (ES); **Craig
Aardahl, Lino Lakes, MN (US); Anil
Mehendale**, Brecksville, OH (US);
Matthew M. Kunz, White Bear Lake,
MN (US); Gregg Lichtscheidl,
Roseville, MN (US); **Aaron D
Benjamin, Maplewood, MN (US); Alan
Harris**, New Brighton, MN (US);
Nityananda Shetty, Hopkinton, MA
(US)

(73) Assignee: HARVARD BIOSCIENCE INC.,
Holliston, MA (US)

( * ) Notice: Subject to any disclaimer, the term of this
patent is extended or adjusted under 35
U.S.C. 154(b) by 91 days.

(21) Appl. No.: 18/605,603

(22) Filed: Mar. 14, 2024

(65) Prior Publication Data

US 2025/0287925 A1      Sep. 18, 2025

(51) Int. Cl.
*A01K 29/00* (2006.01)
*A01K 1/03* (2006.01)
(52) U.S. Cl.
CPC ............ *A01K 29/005* (2013.01); *A01K 1/031*
(2013.01)
(58) Field of Classification Search
CPC ......... A01K 1/03; A01K 1/031; A01K 1/0317
See application file for complete search history.

(56) References Cited

U.S. PATENT DOCUMENTS 4,384,201 A * 5/1983 Carroll ..................... G01V 8/20
                                                              250/221
4,448,150 A * 5/1984 Catsimpoolas ........ A01K 1/031
                                                              250/221
4,968,974 A * 11/1990 Sakano .................. A01K 1/031
                                                              250/221

(Continued)

OTHER PUBLICATIONS

Tatem et al., Behavioral and Locomotor Measurements Using an
Open Field Activity Monitoring System for Skeletal Muscle Dis-
eases, Journal of Visualized Experiments, Sep. 29, 2014, 7sheets,
http://www.jove.com/video/51785.

(Continued)

*Primary Examiner* — Joshua D Huson
*Assistant Examiner* — Alanna K Peterson
(74) *Attorney, Agent, or Firm* — Daughery & Del Zoppo,
Co. LPA

(57) ABSTRACT
An animal rack system includes an animal monitoring
assembly. The animal monitoring assembly includes a study
region configured to receive an animal cage, a first emitter
panel including a first two-dimensional array of first emit-
ters, and a first receiver panel including a first two-dimen-
sional array of first receivers. The first emitter panel and the
first receiver panel are disposed on opposing sides of the
study region. The first emitters are configured to emit first
beams, and the first receivers are configured to receive
emitted first beams from corresponding first emitters. The
first receivers are further configured to generate first signals
indicative of whether the first receivers received the emitted
first beams. The animal monitoring assembly further
includes a console configured to process the first signals to
track an activity of a subject in the study region.

12 Claims, 8 Drawing Sheets

1902

(56)  References Cited

U.S. PATENT DOCUMENTS

| | | | | |
|---|---|---|---|---|
| 5,608,209 | A * | 3/1997 | Matsuda .................. | G01V 8/20 |
| | | | | 250/221 |
| 5,915,332 | A * | 6/1999 | Young .................... | A01K 1/031 |
| | | | | 119/421 |
| 8,425,469 | B2 | 4/2013 | Jacobson et al. | |
| 2014/0251228 | A1 * | 9/2014 | Jensen-Jarolim ........ | A61B 5/01 |
| | | | | 119/421 |

OTHER PUBLICATIONS

Columbus Instruments, Oxymax/Clams Comprehensive Lab Animal Monitoring System for Rats and Mice, downloaded Feb. 13, 2024, 20 sheets, www.colinst.com.
Matikainen-Ankney et al., Rodent Activity Detector (RAD), an Open Source Device for Measuring Activity in Rodent Home Cages, eNeuro Methods/New Tools, Jul./Aug. 2019, 9 sheets, https://doi.org/10.1523/ENEURO.0160-19.2019.
Ugo Basile, Multiple Activity Cage Cat. No. 47420, leaflet, Dec. 2016, 2 sheets, www.ugobasile.com.
Ugo Basile, Ugo Basile Catalogue, Mar. 2023, 32 pages, URL:ugobasile.com.
Klein, et al, Measuring Locomotor Activity and Behavioral Aspects of Rodents Living in the Home-Cage, Frontiers in Behavioral Neuroscience, Apr. 2022, 15 pages, vo. 16, article 877323, www.frontiersin.org.

* cited by examiner

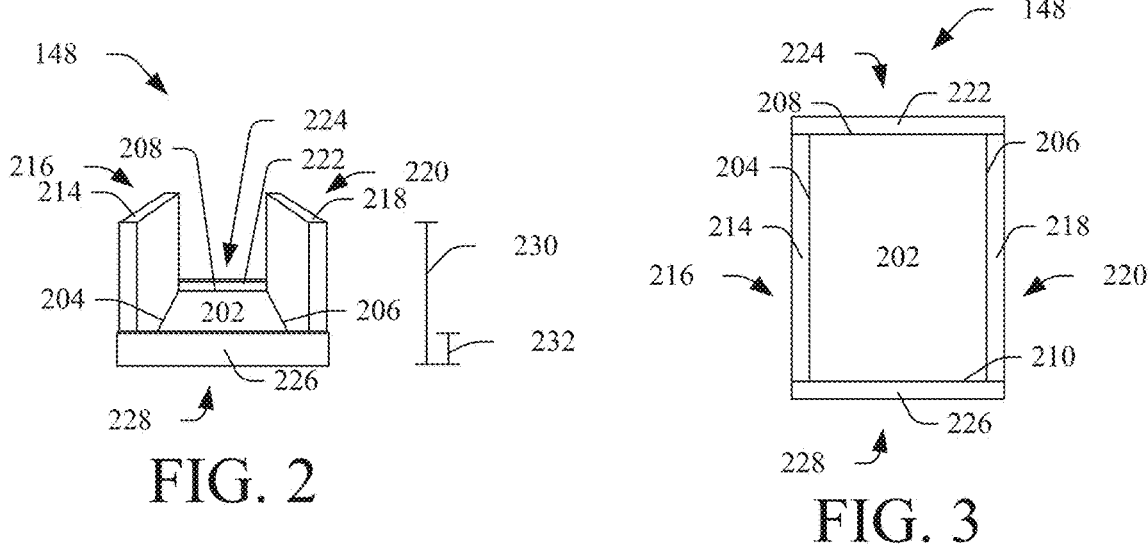
FIG. 2
FIG. 3
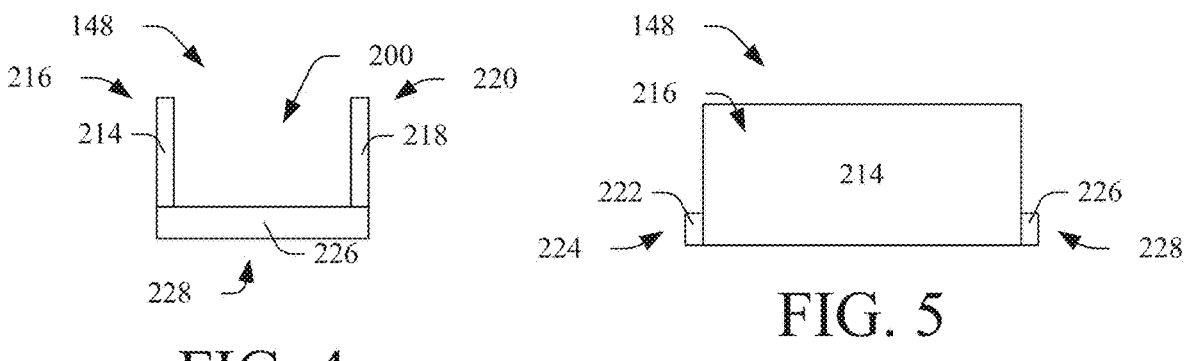
FIG. 4
FIG. 5
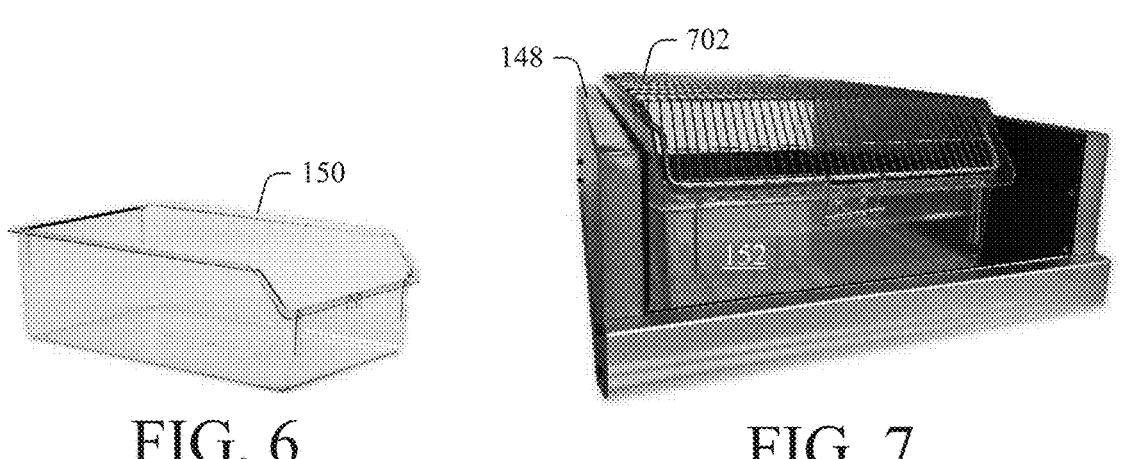
FIG. 6
FIG. 7

ANIMAL ACTIVITY RACK SYSTEM

TECHNICAL FIELD

The following generally relates to monitoring animal activity, and finds particular application to an animal activity rack system for monitoring animal activity in connection with pharmaceutical studies, and is amenable for monitoring animal activity in connection with other studies.

BACKGROUND

The literature indicates that the evaluation of behavioral effects is a component of in vivo screening of pharmaceuticals or potentially toxic compounds in rodents such as mice, rats, etc. With such screening, a pharmaceutical under evaluation is administered to the rodent, and the rodent is placed in an animal activity system. The animal activity system is configured to monitor behavior such as horizontal activity of the rodent (e.g., on its four legs such as walking, running, etc.) and vertical activity of the rodent (e.g., on two legs such as rearing, jumping, etc.).

An example animal activity system includes a study region with first and second opposing sides and third and fourth opposing sides, which are perpendicular to the first and second opposing sides, that define the study region. The study region is configured to support an animal cage and pairs of emitter/receiver arrays on the sides of the study region. Heights of the pairs of emitter/receiver arrays are adjustable, and, for any particular rodent, are determined based on an age, a size, etc. of the rodent so as to capture horizontal and vertical activity of the rodent.

With one animal activity system, a first array of emitters of a first emitter/receiver pair is installed at the first side of the examination region at a first vertical height, and a first corresponding array of receivers of the first emitter/receiver pair is installed at the second opposing side of the examination region at the same first vertical height. A second array of emitters of a second emitter/receiver pair is installed at the first side of the examination region at second vertical height, and a second corresponding array of receivers of the second emitter/receiver pair is installed at the second opposing side of the examination region at the same second vertical height.

In some instances, a third array of emitters of a third emitter/receiver pair is installed at the third side of the examination region at the first vertical height, and a fourth corresponding array of receivers of the third emitter/receiver pair is installed at the second opposing side of the examination region at the first vertical height. The first vertical height of the first and third emitter/receiver pairs corresponds to a height for capturing horizontal activity of the rodent, and the second vertical height of the second emitter/receiver pair corresponds to capturing vertical activity of the rodent.

Each pair of emitters/receivers is installed so that a beam emitted by the emitter, when unobstructed by the rodent in the cage, traverses the cage and is received by the receiver, and, when obstructed by the rodent, is not received by the receiver. Rodent location, at any given time, is determined based on the output signal of the receivers at the first vertical height. This information can be used to track the horizontal activity of the rodent in the cage, e.g., a path of the rodent in the cage. Rodent vertical activity is determined based on the output signal of the receivers at the first second height.

Animal studies have included concurrent evaluation of multiple rodents. For example, in one instance, a study may require concurrent evaluation of at least fifty rodents. Such a study would require fifty animal activity systems. With such a study, personnel manually installs a minimum of three-hundred arrays, e.g., six arrays on each animal activity system. Personnel also aligns the emitter array and the receiver array of each pair so that the receiver array receives the beams from the emitter array when the beam is unobstructed by the rodent. Where multiple studies are performed each day, this process is repeated multiple times.

Unfortunately, the process of installing all of the arrays can be tedious and time consuming, consuming personnel time that could otherwise be used for preparing a rodent for a study, analyzing results from a study, conducting another study with a different rodent, etc. In addition, there is uncertainty with manual height adjustment, and the measurements depend on the height. In addition, the aggregate amount of time consumed to install and set-up each animal activity system for each study limits the number of studies that can be performed each day with the animal activity system.

In view of at least the foregoing, there is an unresolved need for an improved animal activity system.

SUMMARY

Aspects described herein address the above-referenced problems and/or others.

In one aspect, an animal rack system includes an animal monitoring assembly. The animal monitoring assembly includes a study region configured to receive an animal cage. The animal monitoring assembly further includes a first emitter panel including a first two-dimensional array of first emitters. The animal monitoring assembly further includes a first receiver panel including a first two-dimensional array of first receivers. The first emitter panel and the first receiver panel are disposed on opposing sides of the study region. The first emitters are configured to emit first beams, and the first receivers are configured to receive emitted first beams from corresponding first emitters. The first receivers are further configured to generate first signals indicative of whether the first receivers received the emitted first beams. The animal monitoring assembly further includes a console configured to process the first signals to track an activity of a subject in the study region.

In another aspect, a computer-implemented method includes emitting beams from multiple rows of emitters of a first two-dimensional array of first emitters disposed at a first side of a study region. The computer-implemented method further includes receiving a sub-set of the beams that traverse the study region unobstructed by a subject in the study region at multiple rows of receivers of a first two-dimensional array of first receivers disposed at a second side of the study region, which opposes the first side. The computer-implemented method further includes processing first signals corresponding to the received beams to track activity of the subject in the study region.

In another aspect, a computer readable medium encoded with computer executable instructions, which, when executed by a processor, causes the processor to emit beams from multiple rows of emitters of a first two-dimensional array of first emitters disposed at a first side of study region. The instructions further cause the processor to receive a sub-set of the beams that traverse the study region unobstructed by a subject in the study region at multiple rows of receivers of a first two-dimensional array of first receivers disposed at a second side of the study region, which opposes the first side. The instructions further cause the processor to process first signals corresponding to the received beams to track an activity of the subject in the study region.

Those skilled in the art will recognize still other aspects of the present application upon reading and understanding the attached description.

BRIEF DESCRIPTION OF THE DRAWINGS

The invention may take form in various components and arrangements of components, and in various steps and arrangements of steps. The drawings are only for the purposes of illustrating the embodiments and are not to be construed as limiting the invention.

FIG. 2 schematically illustrates a perspective view of an animal monitoring assembly of the animal activity rack system, in accordance with an embodiment(s) herein.

FIG. 3 schematically illustrates a top-down view into the animal monitoring assembly of the animal activity rack system, in accordance with an embodiment(s) herein.

FIG. 4 schematically illustrates a front of the animal monitoring assembly of the animal activity rack system, in accordance with an embodiment(s) herein.

FIG. 5 schematically illustrates a side view of the animal monitoring assembly of the animal activity rack system, in accordance with an embodiment(s) herein.

FIG. 6 schematically illustrates an example animal cage for the animal monitoring assembly of the animal activity rack system, in accordance with an embodiment(s) herein.

FIG. 7 schematically illustrates an example of the animal cage installed in the animal monitoring assembly of the animal activity rack system, in accordance with an embodiment(s) herein.

DESCRIPTION OF EMBODIMENTS

The following describes an animal activity rack system configured to monitor activity of an animal, such as a rodent like a mouse or a rat, including horizontal activity (e.g., activity on four legs such as walking, running, etc.) and vertical activity (e.g., activity on two legs such as rearing, jumping etc.). As described in greater detail below, the animal activity rack system includes multiple sets of emitter/ receiver panel pairs, each panel including a two-dimensional array (grid, matrix, etc.) of emitters or receivers, where the heights of the arrays in the panels correspond to heights to capture horizontal and vertical activity of the animal at various stages (e.g., age, size, etc.) of the animal's life. The captured activity allows for one or more of activity assessment, pharmaceutical screening, toxicology, etc.

Figure 1:
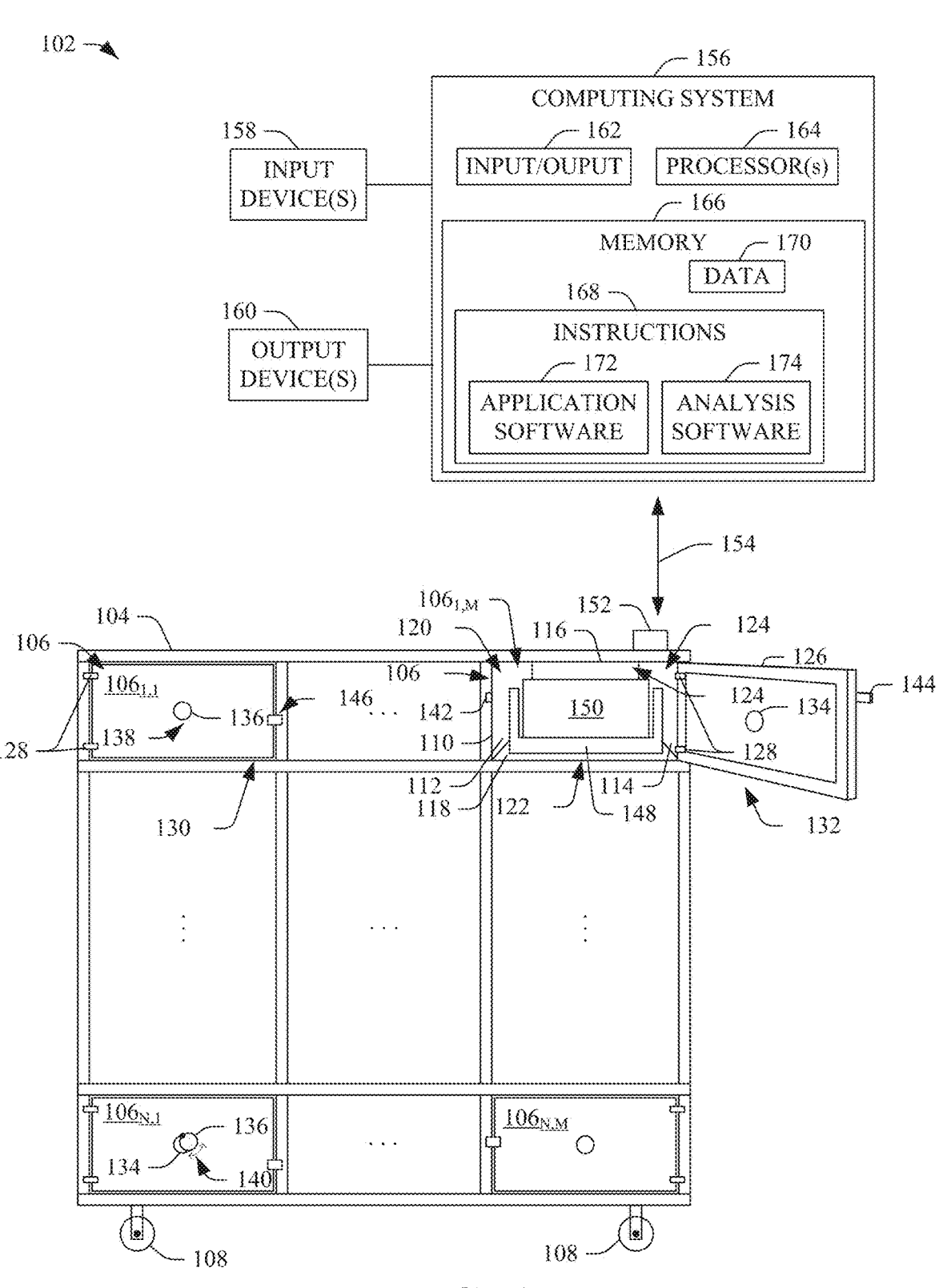
FIG. 1 schematically illustrates an example animal activity rack system, in accordance with an embodiment(s) herein.

Initially referring to FIG. 1, a non-limiting example of an animal activity rack system 102 is schematically illustrated. The animal activity rack system 102 includes a rack 104. The rack 104 includes an N×M array of individual compartments, including a compartment $106_{1,1}$, . . . , a compartment $106_{1,M}$, . . . , a compartment $106_{N,1}$, . . . , a compartment $106_{N,M}$, where N and M are integers equal to or greater than one. Collectively, the compartments $106_{1,1}$, . . . , $106_{1,M}$, . . . , $106_{N,1}$, . . . , $106_{N,M}$ are referred as compartments 106. Non-limiting examples of N and M include, but are not limited to, 1, 2, 3, 4, 5, . . . , e.g., N=M=2 for a 2×2 rack of four compartments 106, N=2 and M=4 for a 2×5 rack of eight compartments 106, N=2 and M=5 for a 2×5 rack of ten compartments 106, etc.

The rack 104 further includes casters 108. In the illustrated embodiment, only two of the casters 108 are visible. With this configuration, the rack 104 is generally mobile or portable. For example, the rack 104 can be moved/rolled via the casters 108 from one location to another location. In one instance, the casters 108 include a mechanism that is user activatable to engage the wheels of the casters 108 so as to inhibit them from rolling (e.g., a wheel lock) or disengage the wheels of the casters 108 to allow them to roll. In another instance, the casters 108 are omitted, and the rack 104 is configured to be placed on the floor, on cart, etc.

Each of the compartments 106 (e.g., the compartment $106_{1,M}$) serves as a container with a closed wall 110 that provides a first side 112, a second side 114, a top 116 and a bottom 118, which collectively surround a cavity 120 and is open at a front region 122 and a back region 124. Each of the compartments 106 further include a door 126 mechanically coupled to the rack 104 through hinges 128 or the like. The door 126 is configured to pivot about the hinges 128 between several positions, including a position 130 at which the door 126 entirely covers the opening at the front region 122 (a closed position) and a set of positions, including a position 132, at which the door 126 does not cover the opening at the front region 122 (an open position).

In the illustrated embodiment, the door 126 further includes a material free region or opening 134, which serves as a window between an outside of the compartments 106 and the cavity 120 of the compartments 106. With this embodiment, the door 126 further includes a cover 136 configured to move between at least two positions, including a position 138 in which the cover 136 is in front of the opening 134 and blocks the opening 134, and another position 140 at which at least a portion of the opening 134 is not blocked. The cover 136 can be configured to pivot in a plane between the positions (as shown), pivot out of plane similar the door 126, and/or otherwise move.

The rack 104 and the door 126 further include complementary components 142 and 144 of a fastening mechanism 146. The complementary components 142 and 144 are configured to engage so that the fastening mechanism 146 maintains the door 126 at the closed position 130 and disengage so as to allow the door 126 to pivot to an open position such as the position 132. The fastening mechanism 146 includes a mechanical locking device, an electromagnetic locking device, a combination thereof, and/or other fastening mechanism(s). When the door 126 is placed in the closed position it blocks visible light from entering the compartment $106_{1,M}$. As such, where the rodent is nocturnal, closing the door 126 facilitates providing an environment more similar to the rodent's natural environment of nighttime. Additionally, or alternatively, closing the door 126 prevents the rodent from being distracted by activities in front of the rack 104. The door 126 and/or the cover 136 can be opened to observe the rodent. The open back region 124 allows for ventilation, etc. In another instance, the back region 124 can be closed via a door or the like.

The animal activity rack system 102 further includes at least one animal monitoring assembly 148 configured to animal monitoring assembly an animal cage 150. As described in greater detail herein, the animal monitoring assembly 148 includes multiple sets of emitter/receiver panel pairs, each panel including a two-dimensional array of emitters or receivers. The vertical configuration of the arrays of a given pair of emitter/receive panels corresponds to horizontal and vertical activity at various stages (e.g., age, size, etc.) of a lifetime of the rodent.

The emitters are configured to emit beams in a wavelength/frequency range that will be absorbed by a rodent in the path of the beams and that is not visible to the rodent, and the receivers are configured to sense beams in the wavelength/frequency range of the emitted beam. A suitable wavelength/frequency range in the electromagnetic spectrum is the infrared (IR) range, or within 750 nanometers (nm) to 1000 microns (μm)/400 terahertz (THz) to 300 gigahertz (GHz). Other wavelength/frequency ranges are contemplated herein.

Each pair of emitters/receivers is installed so that a beam emitted by the emitter, when unobstructed by the rodent in the cage, traverses the cage and is received by the receiver, and, when obstructed by the rodent, is not received by the receiver. The output of the receiver will be at a first level indicative of the beam in response to receiving the beam, and the output of the receiver will be at a second different level in response to not receiving the beam. Rodent horizontal and vertical activity can be determined based off the first and second levels.

In one instance, such panels mitigate manual installation and/or alignment of multiple arrays for each rodent in a study (e.g., six (6) arrays per rodent, as described above) for multiple different studies in a day over one or more days, allows for selecting a vertical height of the active array for a study by selecting which array is active without manual adjustment of an array, and/or reduces set-up time, which can increase the number of studies performed in a day (i.e., throughput).

The animal cage 150 includes a material that is generally transparent to the electromagnetic radiation emitted by the emitters. A suitable material is a polymer such as polycarbonate, polysulfone, etc. When a rodent is outside of a path of beam, the beam traverses the animal cage 150 and is received by a receiver, which generates an output signal at the first level indicating the beam was received. When a rodent is in a path of beam, the beam is absorbed by the rodent, and the receiver generates an output signal at the second level indicating the beam was not received.

The compartments 106 are configured to receive the animal monitoring assembly 148. In one instance, the animal monitoring assembly 148 is removably installed in the compartment $106_{1,M}$ such that it can be readily removed from the compartment $106_{1,M}$. In such an instance, a locking mechanism or the like holds the at least one animal monitoring assembly 148 in place. In another instance, the at least one animal monitoring assembly 148 is affixed in the compartment $106_{1,M}$ to be a part of the compartment $106_{1,M}$, e.g., via rivets, screws, etc. Briefly turning to FIGS. 2, 3, 4 and 5, an example of the animal monitoring assembly 148 is schematically illustrated. FIG. 2 schematically illustrates a perspective view of the animal monitoring assembly 148, FIG. 3 schematically illustrates a top-down view into the animal monitoring assembly 148, FIG. 4 schematically illustrates a front view of the animal monitoring assembly 148, and FIG. 5 schematically illustrates a side view from one of the sides of the animal monitoring assembly 148.

The animal monitoring assembly 148 includes a generally planar, rectangular or square-shaped base 202 (FIGS. 2 and 3). In another instance, the base 202 is otherwise shaped. The base 202 includes a first side 204, a second side 206, a third side 208 (FIGS. 2 and 3) and a fourth side 210 (FIG. 3). A volume enclosed by the sides 204, 206, 208 and 210 serves as a study region 200 (FIG. 4) for the animal cage 150.

The animal monitoring assembly 148 further includes a first panel 214 disposed at a first side 216 (FIGS. 2, 3, 4 and 5) adjacent to the first side 204 of the base 202 (FIGS. 2 and 3). The animal monitoring assembly 148 further includes a second panel 218 disposed at a second side 220 (FIGS. 2, 3 and 4) adjacent to the second side 206 of the base 202 (FIGS. 2 and 3). The first and second panels 214 and 218 are disposed across from each other, on opposite sides 216 and 218 of the study region 200 (FIG. 4).

One of the first or second panels 214 and 218 includes a two-dimensional (2-D) array of emitters and the other of the first or second panels 214 and 218 includes a two-dimensional (2-D) array of receivers. The emitters and receivers are spatially aligned so that the receivers receive electromagnetic radiation emitted by the emitters that is impingent thereon.

Non-limiting example configurations of the emitters and receivers in respective panels 214 and 218 are described in greater detail below.

The animal monitoring assembly 148 further includes a third panel 222 disposed at a third side 224 (FIGS. 2, 3 and 5) adjacent to the third side 208 of the base 202 (FIGS. 2 and 3). The animal monitoring assembly 148 further includes a fourth panel 226 disposed at a fourth side 228 (FIGS. 2, 3, 4 and 5) adjacent to the fourth side 210 of the base 202 (FIG. 3). The third and fourth panels 222 and 226 are disposed across from each other, on opposite sides 224 and 228 of the study region 200. The sides 224 and 228 are generally perpendicular to the sides 216 and 218.

One of the third and fourth panels 222 and 226 includes a two-dimensional (2-D) array of emitters and the other of the third and fourth panels 222 and 226 includes a two-dimensional (2-D) array of receivers. The emitters and receivers are spatially aligned so that the receivers receive electromagnetic radiation emitted by the emitters that is impingent thereon. Non-limiting example configurations of the emitters and receivers in respective panels 222 and 226 are described in greater detail below.

As shown in FIG. 2, the panels 214 and 218 have a first height 230 and the panels 222 and 226 have a second height 232, where the first height 230 is greater than the second height 232. In one instance, the first height 230 corresponds to a height to capture horizontal and vertical activity of interest, and the second height 232 corresponds to a height to capture horizontal activity of interest. In one instance, the second height 232 allows installation of the animal cage 150 in the animal monitoring assembly 148 after the animal monitoring assembly 148 is installed in the compartment 106.

FIG. 6 shows a picture of an example of the animal cage 150. The animal cage 150 has a rectangular volume shape, with five sides and an open top. In another instance, the rectangular volume is divided into multiple sub-sections. FIG. 7 shows the animal cage 150 installed in the animal monitoring assembly 148. In one instance, the animal monitoring assembly 148 and/or the animal cage 150 includes an alignment mechanism (e.g., a bracket, a pin, etc.) to align the animal cage 150 in the animal monitoring assembly 148 each study.

FIG. 7 shows the animal cage 150 with a cover 702 installed over the open top of the animal cage 150. In the illustrated embodiment, the cover 702 includes a mesh. Examples of suitable materials include a metal, a polymer, etc. In one instance, the mesh facilitates keeping the rodent in the animal cage 150. In another instance, the mesh allows the rodent to reach objects on the mesh, e.g., food, where personnel has placed the food on top of the mesh. In another instance, a different cover is placed over the open top of the animal cage 150.

Returning to FIG. 1, the rack 104 further includes a control unit 152. The control unit 152 includes a processor (CPU, μP, etc.), memory, firmware, input/output (I/O), etc. The control unit 152 is in electrical communication with electronics carried in the rack 104, such as electronics of the emitter and/or receive panels of the animal monitoring assembly 148. The control unit 152 is further configured to communicate, via a communications path 154, with electronics remote from the rack 104. The communications path is configured with wired (e.g., a cable, etc.) and/or wireless (e.g., Wi-Fi, Bluetooth, etc.) technology.

The control unit 152 receives output signals from the receivers of the animal monitoring assembly 148. In one instance, the control unit 152 receives the output signals from all of the receivers. In another instance, the control unit 152 receives the output signals from less then all of the receivers, such as only output signals being utilized to evaluate a current study. In one instance, the control unit 152 further includes an output device (e.g., a light emitting diodes (LED), a liquid crystal display (LCD), etc.). In this instance, the control unit 152 present information indicating which of the compartments 106 are currently being utilized for a study. The activity rack system 102 further includes a computing system ("console") 156 such as a workstation, a desktop, a tower, a laptop, etc. The computing system 156 includes an input device(s) 158 such as a keyboard, mouse, touchscreen, microphone, etc., and an output device(s) 160, which includes a human readable device such as a display monitor or the like. The computing system 156 further includes input/output (I/O) 162 for transmitting and/or receiving signals and/or data. The computing system 156, via the I/O 162, is in electrical communication with the control unit 152 and receives the receiver output signals from the control unit 152.

The computing system 156 further includes a processor(s) 164 such as a micro-processing unit (μP), a central processing unit (CPU), etc., and a computer readable storage medium 166 ("MEMORY"), which includes non-transitory medium (e.g., a storage cell, device, etc.) and excludes transitory medium (i.e., signals, carrier waves, and the like). The memory 166 includes computer executable instructions 168 and data 170. In one instance, the data 170 includes the receiver output signals received from the controller unit 152 over the communications path 154.

The computer executable instructions 168 includes application software 172 and analysis software 174. The application software 172 allows a user to control the animal monitoring assembly 148 of the rack 104. In one instance, this includes activating the rack 140, activating one or more rows of emitters/receivers of the panels 214, 218, 222 and 226 of one or more of the monitoring systems 150, testing the emitters/receivers of the active one or more rows, etc. The analysis software 174 processes the data 170, including the signals output by the receivers. As described in greater detail below, this includes generating information regarding animal activity such as location, distance, speed, movement patterns, standing, jumping, hanging, etc.

Figure 8:
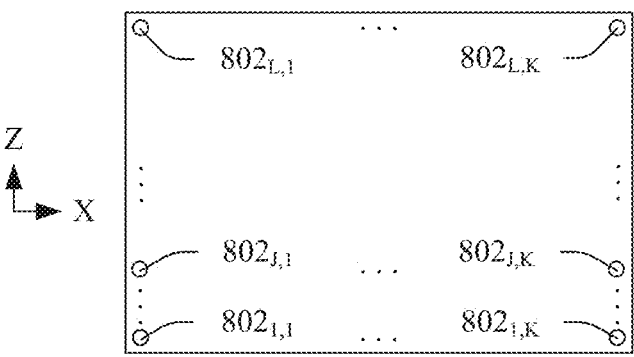
FIG. 8 schematically illustrates an example emitter or receiver panel configured to capture four-legged activity and two-legged activity of an animal in the animal cage installed in the animal monitoring assembly of the animal activity rack system, in accordance with an embodiment(s) herein.
Figure 9:
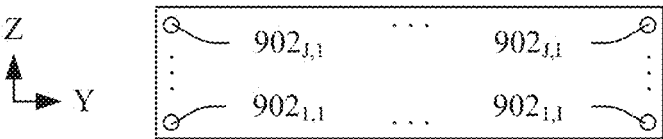
FIG. 9 schematically illustrates an example emitter or receiver panel configured to capture only four-legged activity of the animal in the animal cage installed in the animal monitoring assembly of the animal activity rack system, in accordance with an embodiment(s) herein.

As briefly described in connection with FIGS. 1, 2, 3 and 4, the panel pairs 214/218 and 222/226 each include a 2-D array of emitters and a 2-D array of receivers. FIGS. 8 and 9 schematically illustrate a non-limiting example of the panels 214, 218, 222 and 226. FIG. 8 schematically illustrates a non-limiting example of the panel 214 or 218, and FIG. 9 schematically illustrates a non-limiting example of the panel 222 or 226. For sake of brevity, the term "element" is utilized next to designate emitter or receiver.

In FIG. 8, the panel 214 or 218 includes an element $802_{1,1}, \ldots$, an element $802_{1,K}, \ldots$, an element $802_{1,1}, \ldots$, an element $802_{1,K}, \ldots$, an element $802_{L,1}, \ldots$, and an element $802_{J,K}$, where X represents the horizontal activity direction and Z represents the vertical activity direction, and J and L are indices into the columns, and K is an index into the rows. In one instance, the elements in each row are all equally spaced. In another instance, the elements in each row are not equally spaced. In one instance, the rows are all equally spaced. In another instance, the rows are not equally spaced.

In FIG. 9, the panel 222 or 226 includes an element $902_{1,1}, \ldots$, an element $902_{1,J}, \ldots$, an element $902_{J,1}, \ldots$, and an element $902_{J,I}$, where Y represents the horizontal activity direction and Z represents the vertical activity direction, where J is index into the columns, and I is an index into the rows. In one instance, the elements in each row are all equally spaced. In another instance, the elements in each row are not equally spaced. In one instance, the rows are all equally spaced. In another instance, the rows are not equally spaced.

Figure 10:
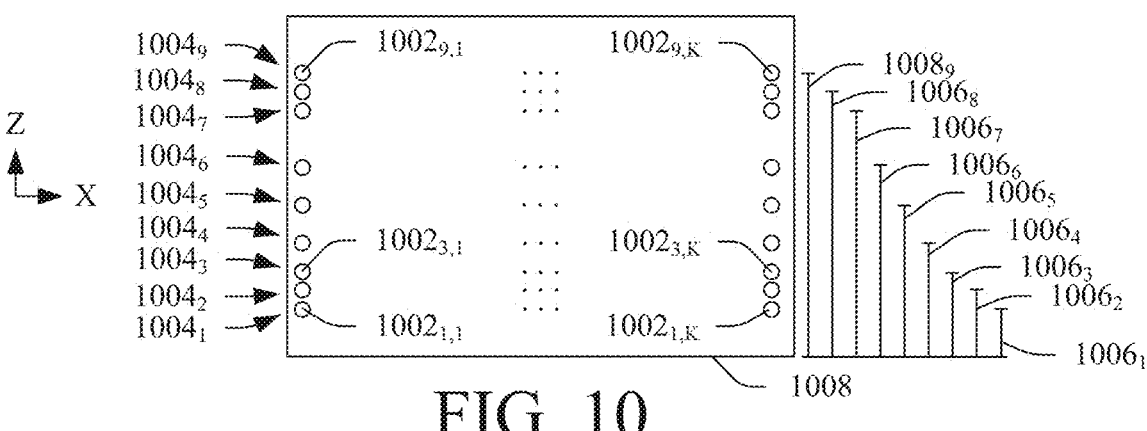
FIG. 10 schematically illustrates another example emitter or receiver panel configured to capture four-legged activity and two-legged activity of an animal in the animal cage installed in the animal monitoring assembly of the animal activity rack system, in accordance with an embodiment(s) herein.
Figure 11:
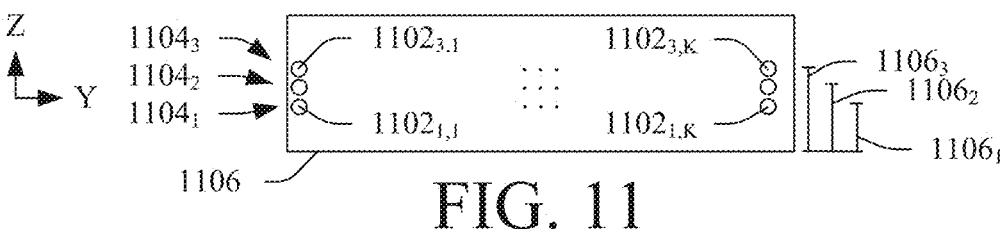
FIG. 11 schematically illustrates another example emitter or receiver panel configured to capture only four-legged activity of the animal in the animal cage installed in the animal monitoring assembly of the animal activity rack system, in accordance with an embodiment(s) herein.

FIGS. 10 and 11 schematically illustrate another non-limiting example of the panels 214, 218, 222 and 226. In one instance, heights of the individual rows correspond to heights of interest for monitoring horizontal and vertical activity of a rat or a mouse. Tables 1 and 2 provide an example of heights of interest. The heights in Tables 1 and 2 correspond to an age of the rodent. In other instance, the heights correspond to size, etc. of the rodent.

TABLE 1

| Emitter/receiver height (in cm) for monitoring rat activity. | | | |
|---|---|---|---|
| Age (days) | Horizontal X Direction | Horizontal Y Direction | Vertical Z Direction |
| 13 | 2.5 | 2.5 | 6 |
| 17 | 2.5 | 2.5 | 8 |
| 22 to 28 | 2.5 | 2.5 | 10 |
| 29 to 35 | 3.5 | 3.5 | 13 |
| 36 to 49 | 3.5 | 3.5 | 14 |
| 50 to 63 | 3.5 | 3.5 | 15 |
| 64 onwards | 4.5 | 4.5 | 15 |

TABLE 2

| Emitter/receiver height (in cm) for monitoring mouse activity. | | | |
|---|---|---|---|
| Age (days) | Horizontal X Direction | Horizontal Z Direction | Vertical Z Direction |
| All | 2.5 | 2.5 | 6 |

With this example, for rats, there are three different heights for monitoring horizontal activity in the X and Y directions and six different heights for monitoring vertical activity in the Z direction, and, for mice, there is one height for monitoring horizontal activity in the X and Y directions and one height for monitoring vertical activity in the Z direction. This corresponds to a configuration with L=9 and J=3. In the below discussion of FIGS. 10 and 11, the term "element" is utilized to represent an emitter or a receiver, depending on whether the panel includes emitters or receivers.

In FIG. 10, the panel 214 or 218 includes an element $1002_{1,1}, \ldots$, an element $1002_{1,K}, \ldots$, an element $1002_{3,1}, \ldots$, an element $1002_{3,K}, \ldots$, an element $1002_{9,1}, \ldots$, and an element $1002_{9,K}$, where X represents the horizontal activity direction and Z represents the vertical activity direction, and K is an index into the rows. In this example, a height of a lowest row corresponds to the lowest height of interest.

A first row $1004_1$ is at a first height $1006_1$ relative to a side 1008 of the panel 214 or 218 that is adjacent to the base 202 (FIGS. 2 and 3) of panel 214 or 218. A second row $1004_2$ is a second height $1006_2$ relative to the side 1008. A third row $1004_3$ is a third height $1006_3$ relative to the side 1008. A fourth row $1004_4$ is a fourth height $1006_4$ relative to the side 1008. A fifth row $1004_5$ is a fifth height $1006_5$ relative to the side 1008. A sixth row $1004_6$ is a sixth height $1006_6$ relative to the side 1008. A seventh row $1004_7$ is a seventh height $1006_7$ relative to the side 1008. An eighth row $1004_8$ is an eighth height $1006_8$ relative to the side 1008. A ninth row $1004_9$ is a ninth height $1006_9$ relative to the side 1008.

Based on Table 1, the first height $1006_1$ in the panel 214 or 218 is 2.5 cm, the second height $1006_2$ in the panel 214 or 218 is 3.5 cm, the third height $1006_3$ in the panel 214 or 218 is 4.5 cm, the fourth height $1006_4$ in the panel 214 or 218 is 6 cm, the fifth height $1006_5$ in the panel 214 or 218 is 8 cm, the sixth height $1006_6$ in the panel 214 or 218 is 10 cm, the seventh height $1006_7$ in the panel 214 or 218 is 13 cm, the eighth height $1006_8$ in the panel 214 or 218 is 14 cm, and the ninth height $1006_9$ in the panel 214 or 218 is 15 cm.

In FIG. 11, the panel 222 or 226 includes an element $1102_{1,1}, \ldots$, an element $1102_{1,K}, \ldots$, an element $1102_{3,1}, \ldots$, and an element $1102_{3,K}$, where Y represents the horizontal activity direction and Z represents the vertical activity direction, and K is an index into the rows.

In this example, a height of a lowest row corresponds to the lowest height of interest. A first row $1104_1$ is first height $1006_1$ relative to a side 1108 of the panel 222 or 226 that is adjacent to the base 202 (FIGS. 2 and 3) of panel 222 or 226. A second row $1104_2$ is a second height $1106_2$ relative to the side 1108. A third row $1104_3$ is a third height $1106_3$ relative to the side 1108.

Based on Table 2, the first height $1106_1$ in the panel 222 or 226 is 2.5 cm, the second height $1106_2$ in in the panel 222 or 226 is 3.5 cm, and the third height $1106_3$ in in the panel 222 or 226 is 4.5 cm. The first height $1106_1$ is the same as the first height $1006_1$ (FIG. 10), the second height $1106_2$ is the same as the second height $1006_2$ (FIG. 10), and the third height $1106_3$ is the same as the third height $1006_3$ (FIG. 10). As such, horizontal activity in the X and Y directions is monitored at a same height.

In one instance, the panel 214, 218, 222 and 226 include circuit boards that carry the emitters and receivers. The electronics can be back and/or front mounted on the circuit boards. In one embodiment, the panels 214, 218, 222 and 226 additionally include one or more components such as a mask, e.g., to mitigate beam cross talk, etc., a 3D blocker, e.g., to mitigate false detections (ghosting) such as reflections (e.g., edge conditions such as from rounded corners, scratches, etc. of the cage 150, etc.), etc. In one instance, the electronics are configured sample the beam in a range of 24-60 frames per second (FPS) such as 40 FPS. Other frame rates are also contemplated herein.

Alternatively, or additionally, false detections from edge conditions are mitigated through activation sequence/timing of the sensing pairs. For example, activation sequence/timing can be implemented to raise the sensing voltage level. With one example, a sensing pair not being used for sensing and adjacent to a sensing pair being used for sensing is powered up to raise the voltage. A similar approach is used to mitigate ghosting due to an object in the study region 200.

In FIGS. 8 and 9, a spacing (pitch) between the rows in the Z direction can be the same. In FIGS. 10 and 11, a spacing between all the rows in the Z direction is not the same, and, in one instance, depends on predetermined heights of interest. In FIGS. 8, 9, 10 and 11, a spacing between elements in the X and/or Y directions can also be the same or not. In one instance, the spacing between neighboring elements in the X and/or Y directions is about 1.27 cm. In general, the spacing is predetermined and based on a resolution of interest. Examples of suitable data rates include 20 to 60 frames per second (FPS), such as 24, 40, etc. FPS. Higher and lower frame rates are contemplated herein.

Figure 12:
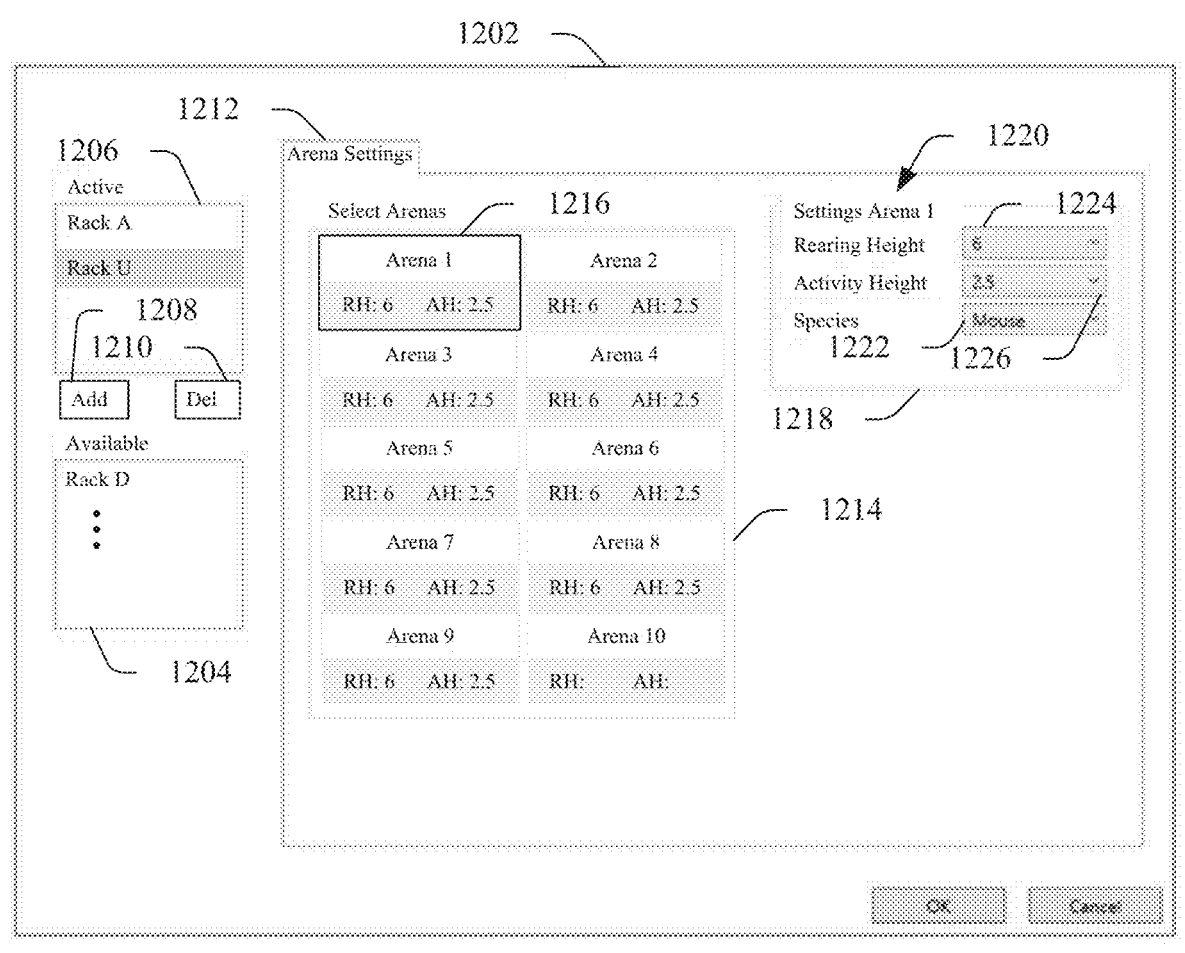
FIG. 12 graphically illustrates an example graphical user interface for setting up animal monitoring assemblies of application software of the animal activity rack system, in accordance with an embodiment(s) herein.

As briefly discussed in connection with FIG. 1, the computer executable instructions 168 include the application software 172, which allows a user to control the animal monitoring assemblies 148 of the rack 104. FIG. 12 illustrates an example graphical user interface (GUI) 1202 of the application software 172. The GUI 1202 includes widgets such as list boxes and drop-down menus for explanatory purposes, but it is to be appreciated that other widgets are contemplated herein, e.g., a combo box, a text box, a button, a check box, etc. In this example, the term "arena" is utilized to represent the animal monitoring assembly 148.

An available rack list box 1204 includes a list of racks 104 (FIG. 1) that are available to be selected to be set up and employed for animal studies. In general, the list of racks in the available rack list box 1204 includes racks that are in electrical communication, via the control unit 152 (FIG. 1) and/or otherwise, with the computing system 156 (FIG. 1) and/or other computing system running the application software 172, which generates and displays the GUI 1202. In the illustrated embodiment, the available rack list box 1204 includes at least a rack with a rack identification of Rack D.

An active list box 1206 includes a list of active racks, which includes racks 104 added from the available list box 1204, e.g., through selection of a rack in the list box 1202 followed by activation of an add control 1208 that adds the selected rack to the active list box 1206. In the illustrated embodiment, the active list box 1206 includes a Rack A and a Rack U, and a currently selected active rack (Rack U) is visually highlighted through a gray scale shading. Other suitable highlighting includes color, pattern, icons, etc. The GUI 1202 further includes a delete control 1210 that moves a rack 104 from the active list box 1206 back to the available rack list box 1204.

An arena settings tab 1212 includes a select arenas list box 1214 that lists current settings for all of the arenas of the rack selected in the active list box 1206 and indicates the currently select arena. In this illustrated example, the Rack U includes ten (10) arenas, and a currently selected arena (Arena 1) is visually highlighted through a shaded border 1216. Other suitable highlighting includes color, pattern, icons, etc. In this example, the information provided for each arena includes a rearing height (RH) and an activity height (AH). In this example, the RH and AH has not yet been set for Arena 10 but has been set for the other arenas. The arena settings tab 1212 further includes a settings list box 1218 that allows a user to set the RH and AH, as well as identify an animal species for analysis, for the currently selected arena. In this example, at 1220, the settings list box 1218 indicates that the settings are for Arena 1, which is the currently selected arena in the select arenas list box 1214. A species drop-down menu 1222 includes a list of available species for analysis, a rearing height drop-down menu 1224 includes a list of available rearing heights for a selected species, and an activity height drop-down menu 1226 includes a list of available activity heights for the selected species.

In the illustrated example, the selected species is a mouse, the rearing height is 6 cm, and the activity height is 2.5 cm. The rearing height and activity heigh selections are reflected in the currently selected Arena 1 in the select arenas list box 1216. In one instance, the rearing height and/or activity heigh values are updated in the select arenas list box 1216 upon selection in the settings list box 1218. In the illustrated example, prior to selecting a rearing height and activity height, the RH and AH in the select arenas list box 1214 are initially set to a null value. In another example, the rearing height and activity height are initially set to another value.

Tables 3 and 4 provide examples of mapping between the age of the rodent, the vertical beam height for the age, and the row index of the panel for the height for the panels 214/218 and 222/226 discussed in FIGS. 10 and 11. Tables 3 and 4 include the height information from Tables 1 and 2 with additional columns designating the row numbers in FIGS. 10 and 11.

TABLE 3

| Rodent age/size mapping to row number for monitoring rat activity. | | | | | | |
|---|---|---|---|---|---|---|
| Age (days) | X Height | X Row | Y Height | Y Row | Z Height | Z Row |
| 13 | 2.5 | 1 | 2.5 | 1 | 6 | 4 |
| 17 | 2.5 | 1 | 2.5 | 1 | 8 | 5 |
| 22 to 28 | 2.5 | 1 | 2.5 | 1 | 10 | 6 |
| 29 to 35 | 3.5 | 2 | 3.5 | 2 | 13 | 7 |
| 36 to 49 | 3.5 | 2 | 3.5 | 2 | 14 | 8 |
| 50 to 63 | 3.5 | 2 | 3.5 | 2 | 15 | 9 |
| 64+ | 4.5 | 3 | 4.5 | 3 | 15 | 9 |

TABLE 4

| Rodent age/size mapping to row number for monitoring mouse activity. | | | | | | |
|---|---|---|---|---|---|---|
| Age (days) | X Height | X Row | Y Height | Y Row | Z Height | Z Row |
| All | 2.5 | 1 | 2.5 | 1 | 6 | 4 |

As briefly discussed in connection with FIG. 1, the application software 172 further allows a user to invoke a self-testing feature that tests the emitters and receivers. In one instance, the user manually activates the self-testing feature, e.g., via clicking on a control widget or the like. In another instance, the self-testing feature automatically runs during setup, e.g., after the user identifies which rows of emitters and receivers are being used in the study, which can be automatically selected based on rodent size, age, etc.

In one instance, a test of the self-testing feature ensures that the emitters and receivers for the selected rows are emitting and receiving within tolerances specified in the specification. Examples of instances where a test might fail or pass with a warning notification include emitter/receiver misalignment, a foreign object (e.g., dirt) on a panel 214, 218, 222 and/or 226 blocking, partially blocking and/or otherwise attenuating the beam, a faulty emitter and/or receiver, a non-functional emitter or receiver, etc.

Figure 13:
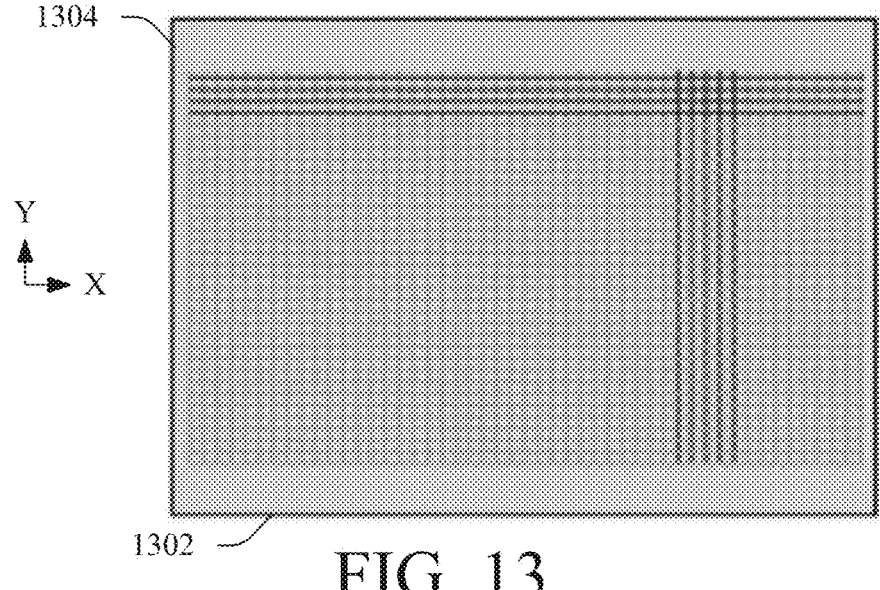
FIG. 13 graphically illustrates an example text for testing emitter/receiver array pairs of the animal activity rack system, in accordance with an embodiment(s) herein.

FIG. 13 illustrates a process to test the emitters and receivers. In FIG. 13, a first axis 1302 represents the X direction, which is a direction along the panels 214 and 218 (FIGS. 2, 3, 4 and 5), and a second axis 1304 represents a Y direction, which is a direction along the panels 222 and 218 (FIGS. 2, 3, 4 and 5).

For the panels 214 and 218, a first set of emitters is activated to emit beams in the X direction, and a first corresponding set of receivers is activated to receive the beams. In one instance, the output of each receiver in the set of receivers is compared to a predetermined threshold value to determine if the output signal is within an acceptable range within tolerances specified in the specification. For a next test, a set of emitters and receivers are tested. The next set could be contiguous with the preceding set and/or overlap the preceding set.

For the panels 222 and 226, a second set of emitters is activated to emit beams in the Y direction, and a second corresponding set of receivers is activated to receive the beams. In one instance, the output of each receiver in the set of receivers is compared to a predetermined threshold value to determine if the output signal is within an acceptable range within tolerances specified in the specification. For a next test, a set of emitters and receivers are tested. The next set could be contiguous with the preceding set and/or overlap the preceding set.

Figure 14:
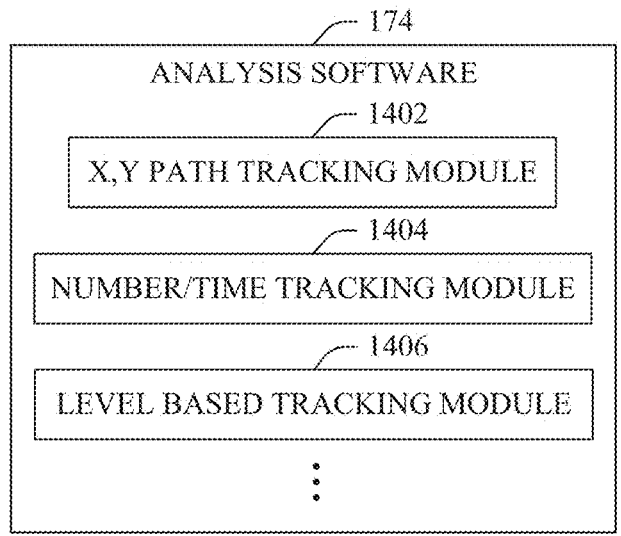
FIG. 14 schematically illustrates an example of analysis software of the animal activity rack system, in accordance with an embodiment(s) herein.

As briefly discussed in connection with FIG. 1, the computer executable instructions 168 further includes the analysis software 174 configured to processes the data 170, including the signals output by the receivers, and generate information related to animal activity such as location, distance, speed, movement patterns, standing, jumping, hanging, etc. FIG. 14 illustrates example software modules of the analysis software 174. In the illustrated embodiment, the analysis software 174 at least includes an X,Y path tracking module 1402, a location number/time tracking module 1404, and a level based tracking module 1406.

Figure 15:
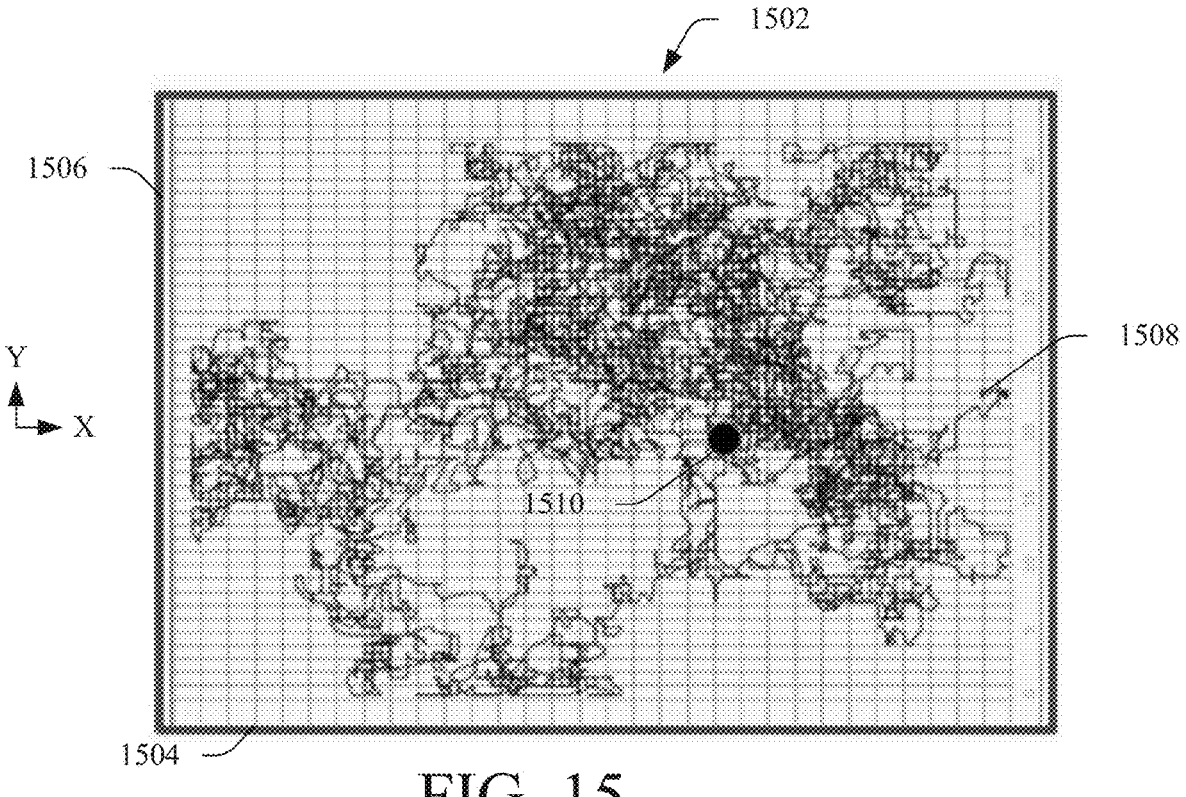
FIG. 15 graphically illustrates an example of tracking a path of a rodent with the analysis software of the animal activity rack system, in accordance with an embodiment(s) herein.

In one instance, the X, Y path tracking module 1402 is configured to track the X, Y path of the animal during the study. Briefly turning to FIG. 15, a graphical mapping 1502 of the X, Y path of the animal is illustrated. A first axis 1504 represents an X direction, which is a direction along the panels 214 or 218 (FIGS. 2, 3 and 4), and a second axis 1506 represents a Y direction, which is a direction along the panels 222 and 218 (FIGS. 2, 3, and 4). The graphical mapping 1502 includes a starting location 1508 of the animal and a continuous path therefrom to a current location 1510.

Figures 16, 17:
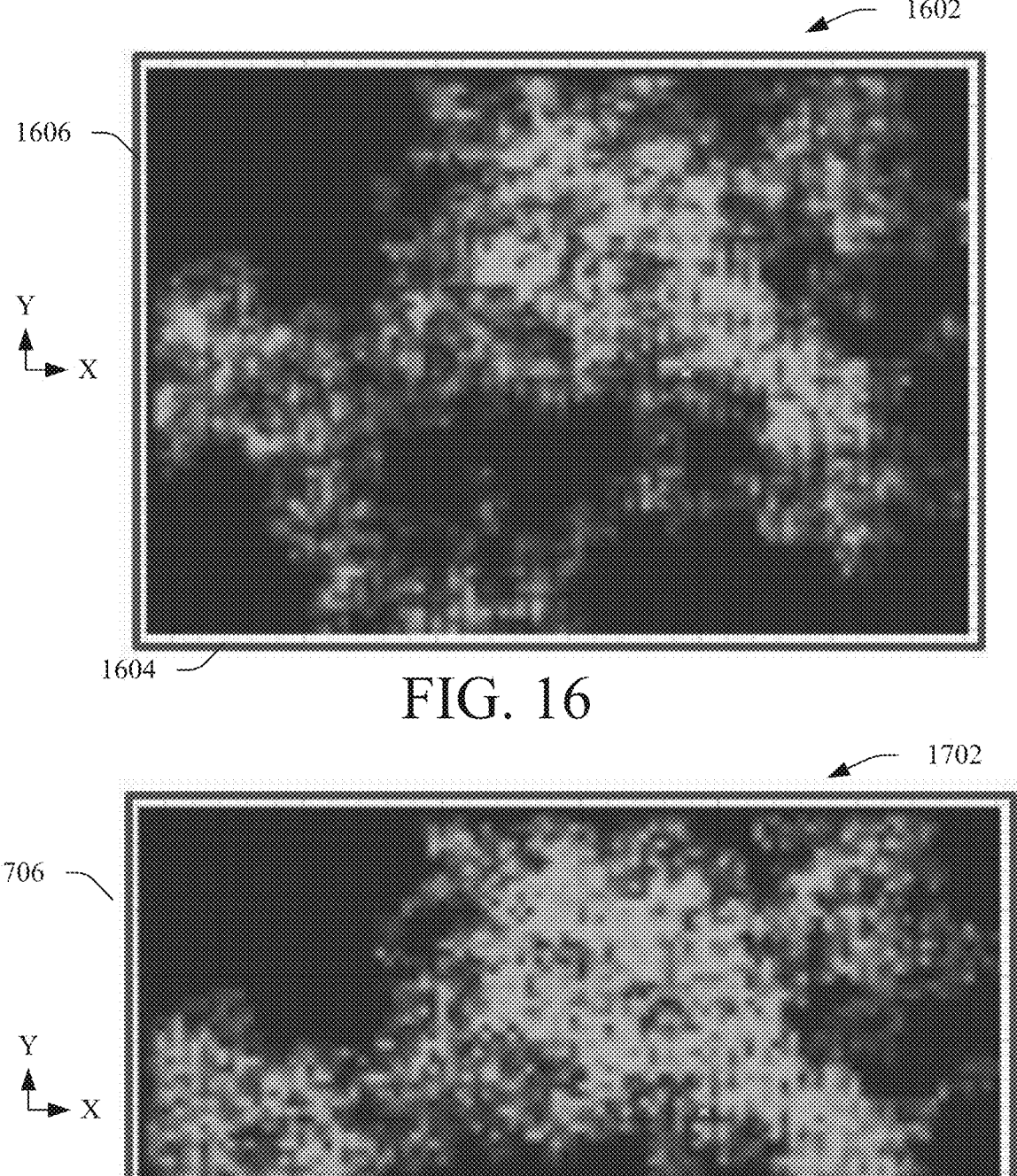
FIG. 16 graphically illustrates an example of a "heat map" of the number of times the animal crosses each location and/or an amount of time the animal is at each location, in accordance with an embodiment(s) herein.
FIG. 17 graphically illustrates an example of a "heat map" of the activity based on speed, in accordance with an embodiment(s) herein.

Returning to FIG. 14, the location number/time tracking module 1404 is configured to determine the number of times the animal crosses each location and/or an amount of time the animal is at each location. Briefly turning to FIG. 16, a graphical mapping 1602 provides a "heat map" of the number of times the animal crosses each location and/or an amount of time the animal is at each location. A first axis 1604 represents an X direction, which is a direction along the panels 214 and 218 (FIGS. 2, 3, and 4), and a second axis 1606 represents a Y direction, which is a direction along the panels 222 and 218 (FIGS. 2, 3, and 4).

The graphical mapping 1602 employs gray scale to indicate the number of times the animal crosses each location and/or an amount of time the animal is at each location. In this example, gray scale values corresponding to darker shades of gray are utilized to represent fewer times and/or less time at a location, lighter shades of gray are utilized to represent greater times and/or more time at a location, and the gray scale values therebetween from darker to lighter shades of gray represents an increasing number of crossings and/or times at a location. The graphical mapping 1502 can also be considered density or distribution mapping.

Returning to FIG. 14, the level based tracking module 1406 is configured to determine an activity of the animal based on a speed of the animal. For example, when the animal is first placed in one of the animal monitoring assembly 148, the animal may move around more quickly than it does later on when the animal become more acclimated in the test cage 150. Briefly turning to FIG. 17, a graphical mapping 1702 provides a "heat map" of the activity based on speed. A first axis 1704 represents an X direction, which is a direction along the panels 214 and 218

(FIGS. 2, 3, and 4), and a second axis 1706 represents a Y direction, which is a direction along the panels 222 and 218 (FIGS. 2, 3, and 4).

The graphical mapping 1702 employs gray scale to indicate activity as a function of speed at each location. In this example, gray scale values corresponding to darker shades of gray are utilized to represent a slower speed, lighter shades of gray are utilized to represent a faster speed, and the gray scale values therebetween from darker to lighter shades of gray represents an increasing speed at a location. The graphical mapping 1702 can also be considered density or distribution mapping.

Returning to FIG. 14, examples of additional, or alternative, information that can be provided by the analysis software 174 includes, but is not limited to, distance, speed, movement patterns, rearing, jumping, and hanging.

Figures 18, 19, 20, 21:
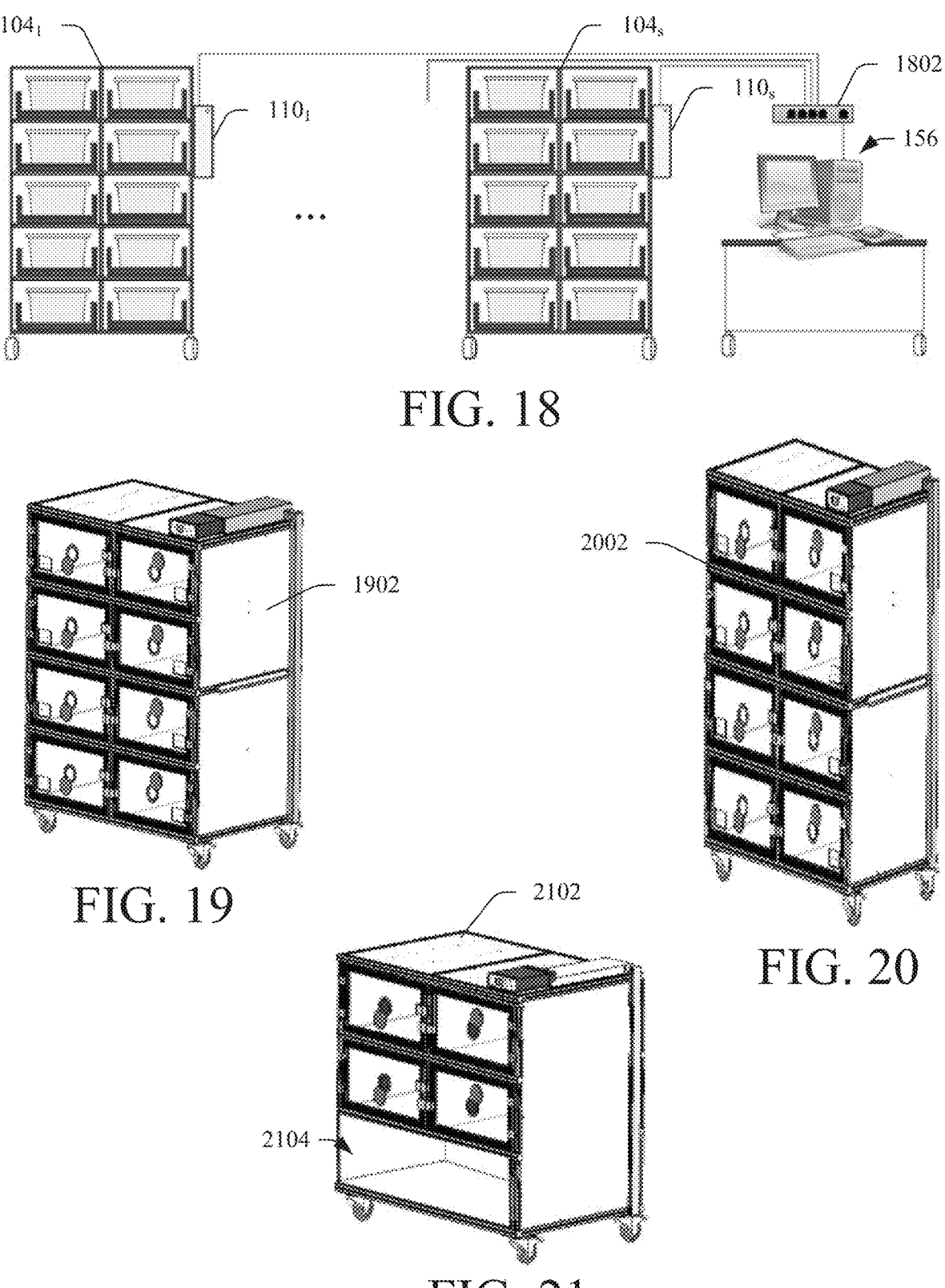
FIG. 18 graphically illustrates a variation in which the animal activity rack system includes multiple racks, in accordance with an embodiment(s) herein.
FIG. 19 graphically illustrates a variation in a rack of the animal activity rack system, in accordance with an embodiment(s) herein.
FIG. 20 graphically illustrates another variation in a rack of the animal activity rack system, in accordance with an embodiment(s) herein.
FIG. 21 graphically illustrates yet another variation in a rack of the animal activity rack system, in accordance with an embodiment(s) herein.

FIG. 1 schematically illustrates a single rack 104 in electrical communication with the computing system 156. FIG. 18 schematically illustrates a variation in which a plurality of racks, including a rack $104_1$, . . . , $104_s$, where s is an integer equal to or greater than one (1), are in electrical communication with the computing system 156. In this example, the controller unit of each rack, a controller unit $110_1$, . . . , and a controller unit $104s$ are each in electrical communication with a signal routing device 1802 such as a switch, a bridge, a hub, a router, etc., which is in electrical communication with the computing system 156. The racks 104 in FIG. 18 each include ten (10) animal monitoring assemblies. As such, the example in FIG. 18 can be used to concurrently study 10 times s animals, or 10s animals. For instance, where s=2, the example in FIG. 18 can be used to concurrently study 20 animals. In another instance, where s=3, the example in FIG. 18 can be used to concurrently study 30 animals.

The rack 104 in FIG. 1 is configured to include N×M animal monitoring assemblies. FIGS. 19, 20 and 21 illustrate variations of racks 104 with different number of cage animal monitoring assemblies 148. In FIGS. 19 and 20, the racks 1902 and 2002 each include 2×4, or eight (8) animal monitoring assemblies. Each animal monitoring assembly in FIG. 19 has a first dimension (length×width×height), and each animal monitoring assembly in FIG. 20 has a second dimension (length×width×height), where the first dimension is different from the second dimension. In FIG. 21, the rack 2102 includes 2×2, or four (4) animal monitoring assemblies. The rack 2102 further includes a cavity 2104 closed on five (5) sides and open on one (1) side. In one instance, the cavity 2104 can be used as a shelf or the like. In another instance, the rack 2102 is scalable and additional animal monitoring assemblies can be purchased and installed in the cavity 2104. In FIG. 18, each of the racks is configured to include ten (10) animal monitoring assemblies. It is to be appreciated that the racks 104 in FIG. 18 can include a combination of the racks in FIGS. 18, 19, 20 and 21, and/or other configuration of racks.

In yet another instance, a cage animal monitoring assembly 148 is utilized without the rack 104. In this instance, the cage animal monitoring assembly 148 communicates with the computing system 156 directly (wired and/or wirelessly), the control 152 (as described herein), and/or through another communications device and/or channel.

Figure 22:
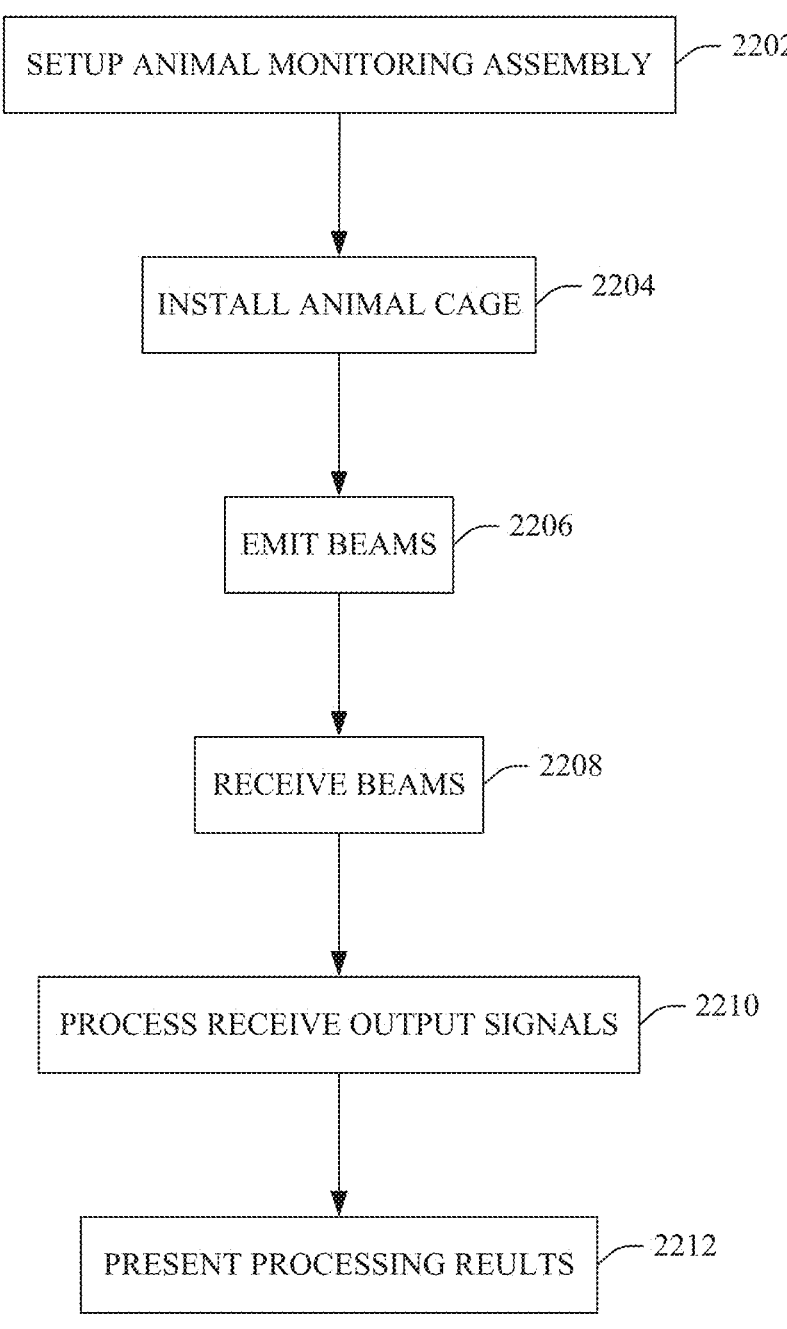
FIG. 22 illustrates an example method, in accordance with an embodiment(s) herein.

FIG. 22 discloses a method in accordance with an embodiment herein. It is to be appreciated that the ordering of the acts of the method is not limiting. As such, other orderings are contemplated herein. In addition, one or more acts may be omitted, and/or one or more additional acts may be included.

At 2202, application software is utilized to set up one or more animal monitoring assemblies of one or more racks, as described herein and/or otherwise. As discussed herein, this includes providing information that identifies which rows of the 2D panels of emitter/receivers will provide the data to process for tracking activity.

At 2204, an animal cage is installed in one or more of the one or more animal monitoring assemblies, as described herein and/or otherwise.

At 2206, the emitters emit beams that traverse the study region, as described herein and/or otherwise.

At 2208, the receivers receive a sub-set of the emitted beams that traverse the study region without being obstructed by the subject in the cage, as described herein and/or otherwise.

At 2210, signals from the receivers indicative of whether an emitted beam was received or not are processed to track activity of the subject, as described herein and/or otherwise.

At 2212, results of processing can be presented for analysis, as described herein and/or otherwise.

The above methods can be implemented at least in part by way of computer readable instructions, encoded, or embedded on the computer readable storage medium, which, when executed by a computer processor, cause the processor to carry out the described acts or functions. Additionally, or alternatively, at least one of the computer readable instructions is carried out by a signal, carrier wave or other transitory medium, which is not computer readable storage medium.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

The word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. An animal rack system, comprising:
an animal monitoring assembly, including:
   a study region configured to receive an animal cage;
   a first emitter panel including a first two-dimensional array of first emitters, wherein the first two-dimensional array of the first emitters includes:
      a first plurality of rows of emitters respectively disposed at a first plurality of heights, wherein each height of the first plurality of heights corresponds to horizontal activity indicative of a particular age range of the animal; and
      a second plurality of rows of emitters respectively disposed at a second plurality of heights, wherein each height of the second plurality of heights corresponds to vertical activity indicative of the particular age range of the animal; and
   a first receiver panel including a first two-dimensional array of first receivers, wherein the first two-dimensional array of the first receivers includes:
      a corresponding first plurality of rows of receivers respectively disposed at the first plurality of heights; and
      a corresponding second plurality of rows of receivers respectively disposed at the second plurality of heights,
   wherein the first emitter panel and the first receiver panel are disposed on opposing sides of the study region,
   wherein the first emitters are configured to emit first beams, and the first receivers are configured to receive emitted first beams from corresponding first emitters, and
   wherein the first receivers are further configured to generate first signals indicative of whether the first receivers received the emitted first beams; and
a console configured to process the first signals based on an input that indicates at least a first height of a current animal in the study region corresponding to an age of the current animal to track horizontal activity of the current animal in the study region and a second height of the current animal in the study region corresponding to the age of the current animal to track vertical activity of the current animal in the study region.

2. The animal rack system of claim 1, wherein rows, with respect to each other, of the first plurality of rows are equally spaced.

3. The animal rack system of claim 1, wherein the second plurality of heights is greater than the first plurality of heights.

4. The animal rack system of claim 1, wherein rows, with respect to each other, of the second plurality of rows are not all equally spaced.

5. The animal rack system of claim 1, wherein the console only processes signals of the first signals that correspond to the first height and the second height.

6. The animal rack system of claim 1, the animal monitoring assembly, further comprising:
a second emitter panel including a second two-dimensional array of second emitters, wherein the second two-dimensional array of the second emitters includes:
   a third plurality of rows of emitters respectively disposed at the first plurality of heights, wherein each height of the third plurality of heights corresponds to horizontal activity indicative of the particular age range of the animal; and
a second receiver panel including a second two-dimensional array of second receivers, wherein the second two-dimensional array of the second receivers includes:
   a corresponding third plurality of rows of receivers respectively disposed at the first plurality of heights
wherein the second emitter panel and the second receiver panel are disposed on opposing sides of the study region,
wherein the second emitters are configured to emit second beams,
wherein the second receivers are configured to receive emitted second beams from corresponding second emitters, wherein the second receivers are further configured to generate second signals indicative of whether the second receivers received the emitted second beam, and wherein the console is further configured to process the second signals based on the input that indicates the first height to track the horizontal activity of the animal in the study region.

7. The animal rack system of claim 6, wherein the console includes a mapping of a plurality of animal age ranges to the plurality of first and second heights.

8. The animal rack system of claim 6, wherein console includes a first mapping of a first plurality of animal age ranges to the plurality of first and second heights for a first type of animal and a second mapping of a second plurality of animal age ranges to the plurality of first and second heights for a second type of animal.

9. The animal rack system of claim 6, wherein the first emitter panel and the first receiver panel have a first height, the second emitter panel and the second receiver panel have a second height, and the first height is greater than the second height.

10. The animal rack system of claim 6, wherein the first emitter panel and receiver panel are orthogonal to the second emitter panel and receiver panel about the study region.

11. The animal rack system of claim 1, further comprising:

at least one rack including at least one compartment configured to receive the animal monitoring assembly.

12. The animal rack system of claim 1, further comprising:

a first rack including a first compartment configured to receive the animal monitoring assembly.

\* \* \* \* \*